No. 824,414. PATENTED JUNE 26, 1906.
W. L. CROWSON.
ROLLER COTTON GIN.
APPLICATION FILED SEPT. 15, 1905.
4 SHEETS—SHEET 1.
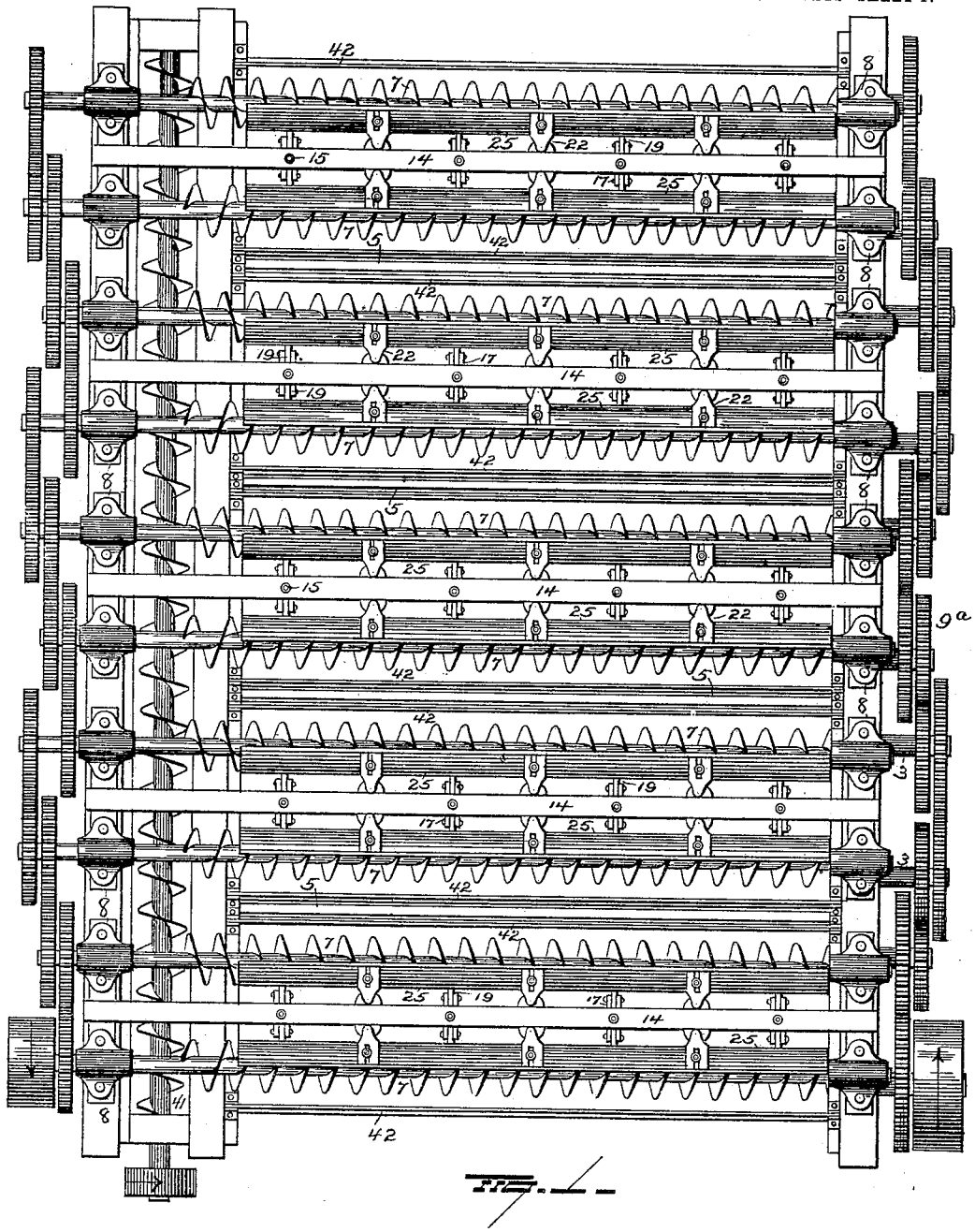

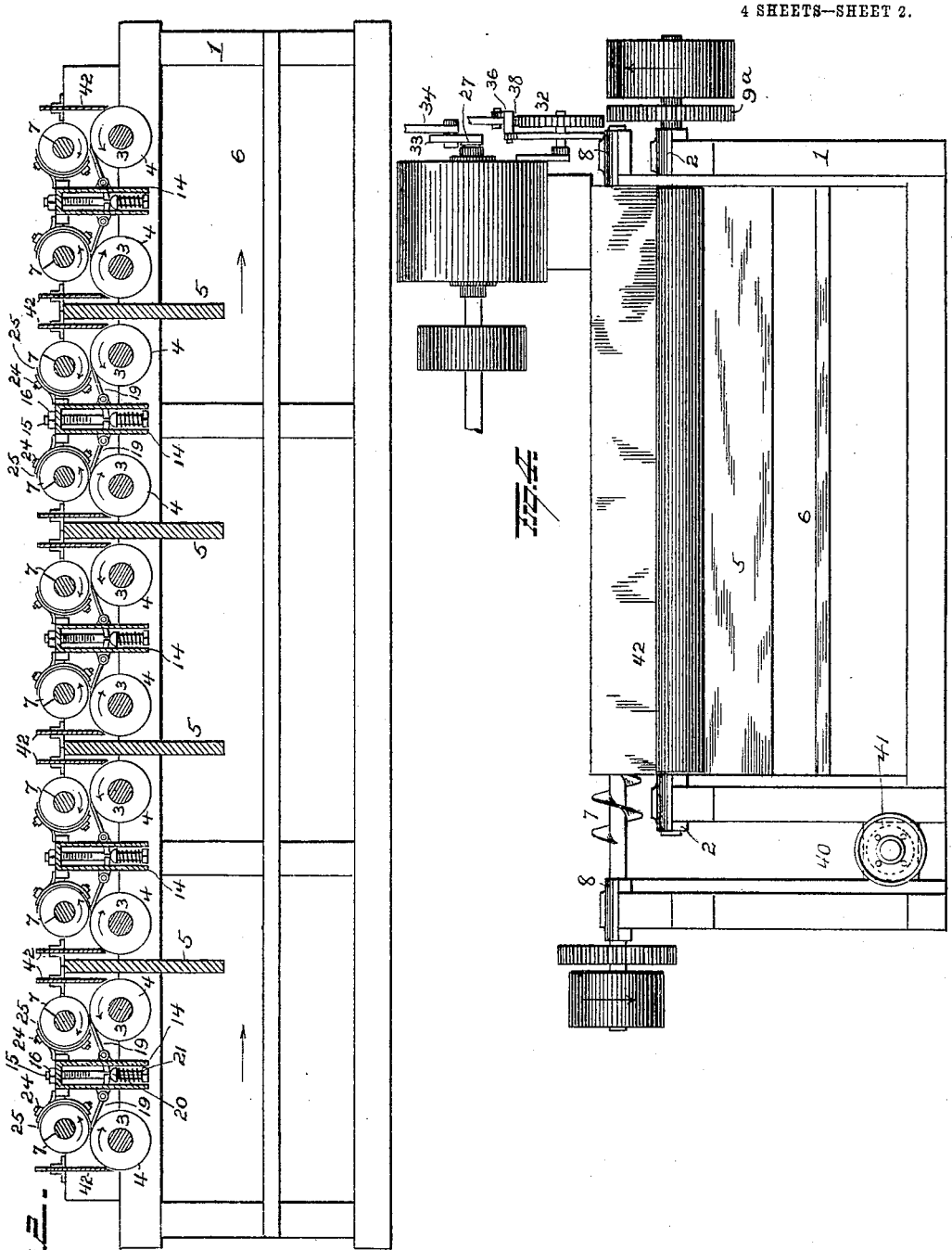

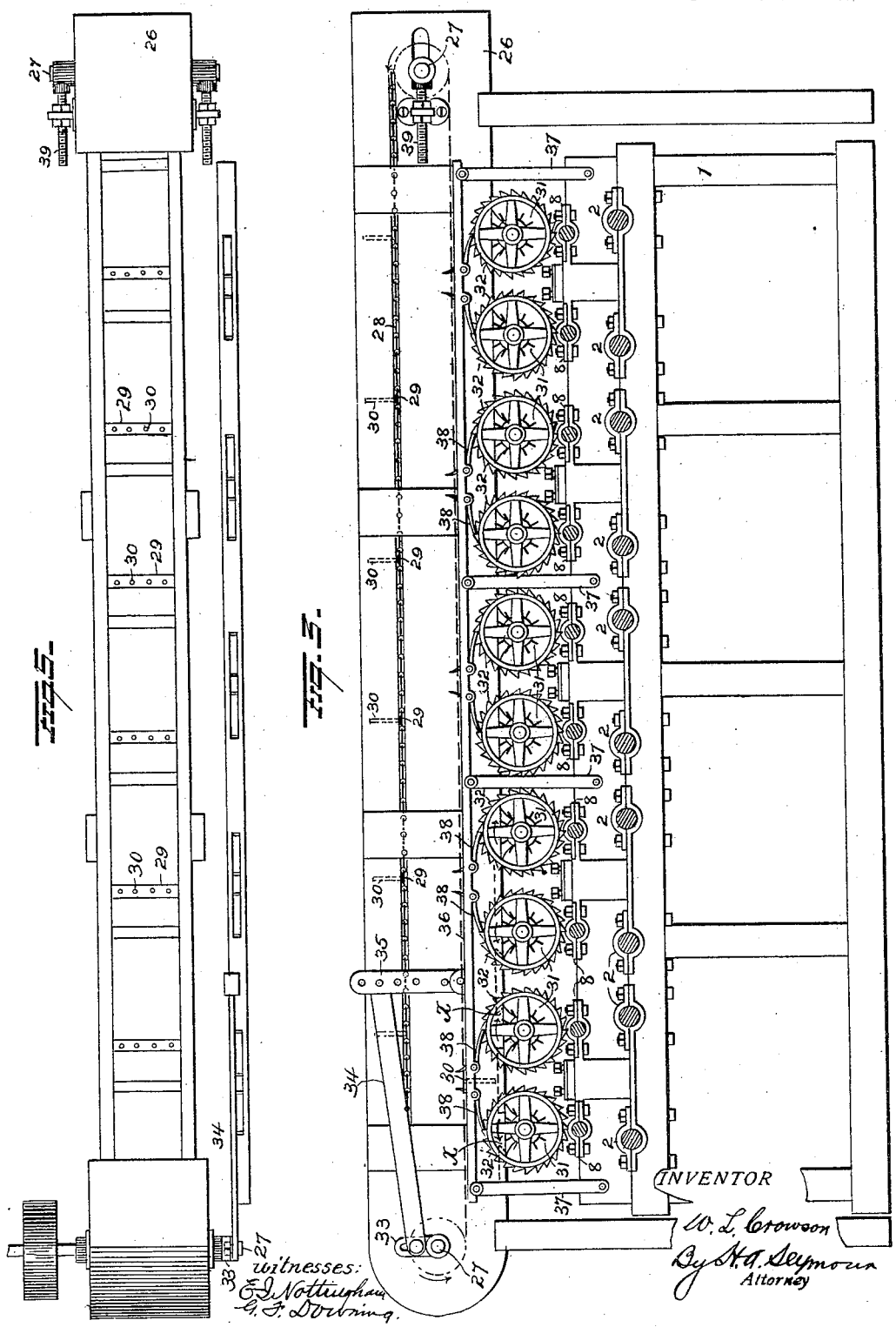

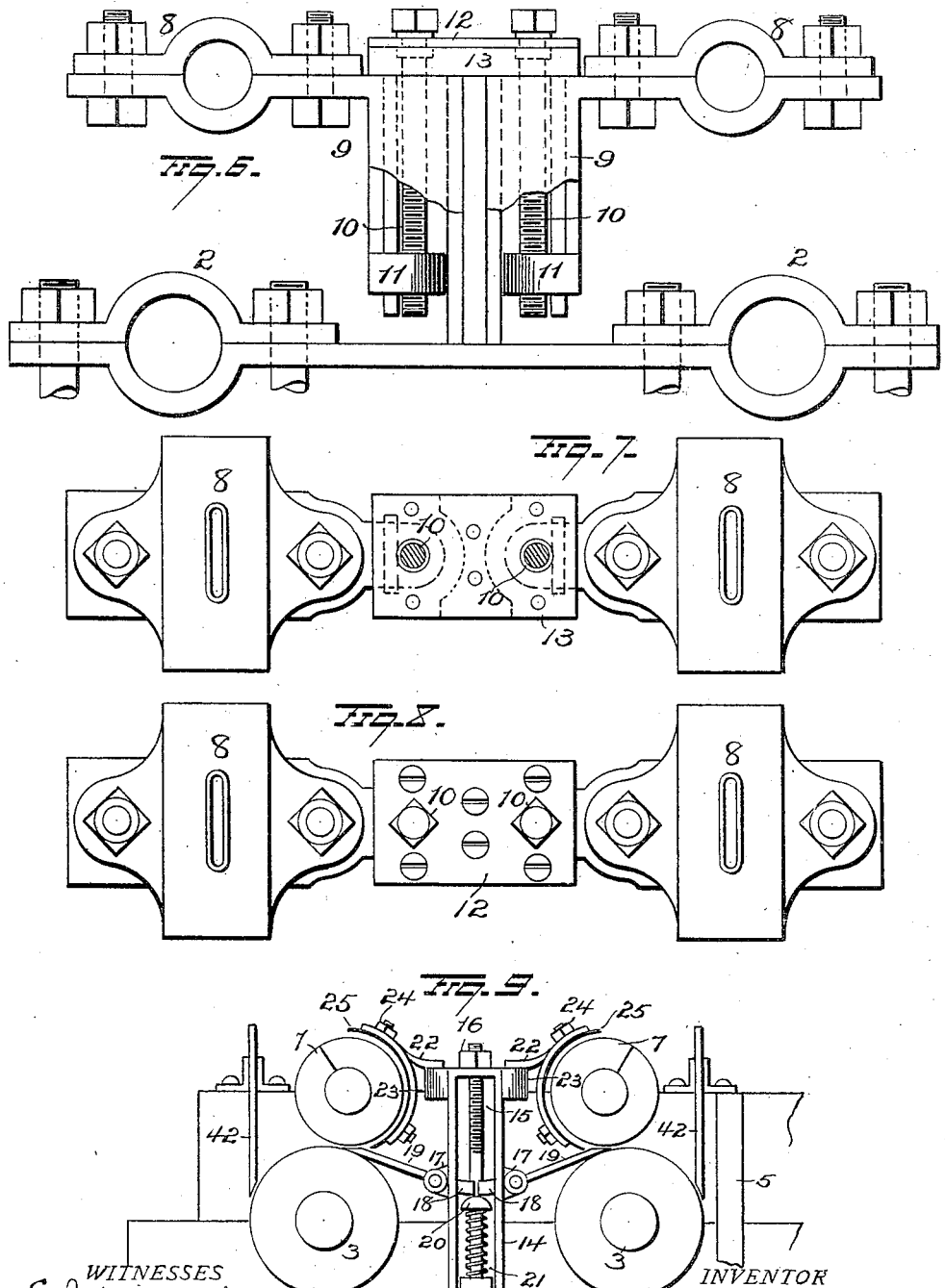

UNITED STATES PATENT OFFICE.

WILLIAM L. CROWSON, OF JACKSON, TENNESSEE, ASSIGNOR OF ONE-FOURTH TO JOHN M. BRAUN, ONE-FOURTH TO JOSEPH E. BRAUN, AND ONE-FOURTH TO ROMAN BRAUN, OF MEMPHIS, TENNESSEE.

ROLLER COTTON-GIN.

No. 824,414.     Specification of Letters Patent.     Patented June 26, 1906.

Application filed September 15, 1905. Serial No. 278,636.

*To all whom it may concern:*

Be it known that I, WILLIAM L. CROWSON, a resident of Jackson, in the county of Madison and State of Tennessee, have invented certain new and useful Improvements in Roller Cotton-Gins; and I do hereby declare the following to be a full, clear, and exact description of the invention such as will enable others skilled in the art to which it appertains to make and use the same.

My invention relates to improvements in roller cotton-gins, the object of the invention being to provide an improved series of rollers with improved coöperating parts wherein the distribution of seed, feed of seed, and ginning operation of all of the rollers is rendered automatic and resulting in a maximum output and economical expenditure of time and labor.

A further object is to provide an improved construction of feeder taking the place of the well-known beaters and which may be adjusted while the machine is in operation to secure the best results.

A further object is to provide improved construction and mounting for the doctor-knives which are simultaneously controlled in pairs, and their spring-pressure can be adjusted at will.

A further object is to provide improved mechanism for feeding and distributing the seed-cotton to the several rollers, improved means for removing the cotton and moving the seed longitudinally of the rollers, and improved means for collecting and removing the cotton and seed.

A further object is to provide improvements of this character of comparatively simple construction, strong, and durable in use, and which will most thoroughly separate a maximum amount of cotton and seed without damage to either the seed or cotton.

With these and other objects in view the invention consists in certain novel features of construction and combinations and arrangements of parts as will be more fully hereinafter described, and pointed out in the claims.

The difficulty to be overcome in introducing the roller cotton-gin in the south is to make it gin with sufficient speed to meet the demand of the planter. To gin the cotton properly, a single roller will not produce more than seven hundred and fifty pounds of lint cotton in ten hours, whereas a seventy-saw gin will yield from four to five thousand pounds in the same time. To overcome this difficulty I have constructed a roller gin in which a large number of rollers may be used and all fed automatically by the same distributer and feeder. My improved gin has preferably ten rollers, and when properly run such a gin should turn out fifteen bales a day of five hundred pounds each The advantage to be derived from the use of the roller gin is that cotton ginned by the roller process is worth about fifteen per cent. more than the same cotton ginned on the saw-gin. The increased value of the roller-ginned cotton results from the fact that the fiber is preserved entire when the rollers are run at the proper speed, whereas with the saw-gin the fiber is broken or cut, causing a damage of from twelve to twenty-five per cent.

In the accompanying drawings, Figure 1 is a top plan view with distributer removed. Fig. 2 is a view in longitudinal section. Fig. 3 is a view in side elevation. Fig. 4 is an end view. Fig. 5 is a top plan view of the distributer, and Figs. 6, 7, and 8 are detail views of the adjustable bearings for the screw conveyers or beaters. Fig. 9 is an enlarged view showing one pair of rollers 4, conveyers 7, knives 19, and coöperating devices.

1 represents the boxing or framework of my improved gin on which bearings 2 are secured and adapted to receive the shafts 3, carrying rollers 4, which may be covered with leather, cotton duck, or other suitable material. These rollers 4, ten of which are illustrated, are arranged to operate in pairs and are separated by partitions 5, extending down into the cotton-suction flue 6. Above each roller 4 horizontal screw conveyers 7 are located and take the place of beaters, such as now in use, and for convenience of reference they will be hereinafter referred to as "screw-beaters." These screw-beaters are supported at their ends in bearings 8, and a chain of gearing 9ª transmits motion to the roller-shafts 3 and beaters 7 to drive them in the proper direction and at the proper speed.

The bearings 8 are supported by boxes 9, held by means of adjusting-screws 10, located in threaded collars 11 on the boxes and supported in T-shaped standards 13 on the bearing-plates 2, and sectional plates 12 are secured on standards 13 and have openings to receive the screws and rest in grooves therein to prevent longitudinal movement thereof, hence compelling the adjustment of bearings 8 when the screws are turned. The screws 10 have angular heads on their upper ends to facilitate their adjustment, and it will be seen that these screws can be turned and the screw-beaters adjusted with relation to the rollers 4 while the gin is in operation, and therefore the parts may be adjusted to secure the best results.

Between each pair of rollers 4 and beaters 7 open frames 14 are located and support screws 15, having heads at their lower ends and adjusting-nuts 16 at their upper ends. These frames 14 are provided with lugs 17 at opposite sides, in which the arms 18 of doctor-knives 19 are fulcrumed between their ends, and the inner ends of said arms are engaged from beneath by rounded collars 20, held up by coiled springs 21 on the screws 15 to hold the doctor-knives in close contact with rollers 4, and it will be seen that by adjusting the screws 15 or nuts 16 each pair of doctor-knives can be simultaneously adjusted.

Curved brackets 22 are provided with pins located in lugs 23 at the top of frame 14, and said brackets are slotted to receive clamping screws and nuts 24, adjustably securing curved metal plates 25 thereto. These plates 25 partially surround the screw-beaters and bear against the doctor-knives to guide the seed along the rollers and prevent any escaping into the cotton-flues.

At one side of the machine an elongated distributer-box 26 is located above the beaters and is provided at its respective ends with mountings for shafts 27. The shafts 27 are provided with sprocket-wheels over which endless chains 28 pass, and said chains are provided at intervals with cross-bars 29, having pins 30 thereon to feed the cotton deposited in the box to the points marked X. Toothed wheels 31 are supported above the screw-beaters, and openings are provided in the bottom of the box 26 to drop the cotton thereon when moved to the openings by the finger-bars 29. These toothed wheels 31 are secured upon shafts having ratchet-wheels 32 on their outer ends and operated by mechanism which will now be explained.

One of the shafts 27 has a slotted crank-arm 33 on its end reciprocating a pitman 34, which latter is connected with the long end of a lever 35, fulcrumed between its ends, and the short end of this lever 35 has movable engagement with a reciprocating bar 36, supported on links 37. Pawls or dogs 38 are located at the proper intervals on bar 36 to engage ratchet-wheels 32 and turn them and toothed wheels 31 as the bar 36 is reciprocated to feed the cotton down to the screw-beaters, and the movement of the bar 36 can be varied by adjusting either the connection between crank-arm 33 and pitman 34 or the connection between lever 35 and bar 36 and the speed of the toothed wheels 31 varied to suit conditions.

Chain-tighteners 39 are located at one end of box 26 to take up slack in the chains 28, and suitable driving-pulleys are provided to drive the several shafts, as clearly shown.

The seed drops from the rollers 4 at the end of the machine opposite to distributer-box 26 into a trough 40, in which a screen or other conveyer 41 is located to convey the seed to a suitable outlet, and the cotton falls into the suction-flue and is drawn out of the machine to the condenser, which forms no part of this invention.

Vertical plates 42 are supported in the framework and bear against rollers 4, forming compartments for the seed-cotton and preventing any seed or trash falling down into the cotton-flues.

The operation of my improvements is as follows: The seed-cotton deposited in box 26 is carried by finger-bars 29 to openings in the bottom of the box and fed to toothed wheels 31, which force the seed-cotton down between the flights of the screw-beaters 7, and the latter hold the seed-cotton down to the rollers 4, which move the same against the doctor-knives 19, which hold back the seed, but permit the cotton to be drawn beneath them and deposited into the suction-flue 6. The seed and cotton are carried along by the screw-beaters 7 and continuously subjected to the action of the rollers 4 against the doctor-knives until practically all cotton is removed and the seed is dropped into the trough 40 and carried out by conveyer 41. The curved plates 25 and straight plates 42 form a compartment in which the ginning is accomplished, and all seed and trash are held therein and prevented from falling into the suction-flue 6 for cotton.

The screw-beaters can be adjusted with relation to the rollers 4 while the machine is in operation, as above explained, and the best possible results can therefore be accomplished. The spring-tension of the doctor-knives can be varied at will, and all parts can be adjusted to perform their best work. Should any part become worn or injured, it can be replaced at small expenditure of time and money, and all parts are of simple inexpensive construction not liable to get out of repair.

While I have illustrated ten rollers 4, with coöperating mechanism, I do not restrict myself to any number, but may employ more or less than ten, according to the desire of the trade.

A great many other slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus of the character described, the combination with a pair of rollers, of doctor-knives for the rollers, means for exerting spring-pressure on both of said knives, and means for simultaneously adjusting the spring-pressure of both of said knives.

2. In an apparatus of the character described, the combination with a pair of rollers, of doctor-knives for the rollers, a coiled spring pressing both knives against the rolls, and a bolt and nut regulating the tension of the coiled spring.

3. In an apparatus of the character described, the combination with a roller, of a screw conveyer and beater for moving the seed longitudinally of the roller, and a doctor-knife against the roller.

4. In an apparatus of the character described, the combination with a roller, of a doctor-knife against the roller, a curved adjustable plate against the knife and a screw conveyer above and parallel with the roller.

5. In an apparatus of the character described, the combination of a pair of rollers and a frame between them, of doctor-knives supported in the frame and bearing against the rollers, a spring pressing both doctor-knives against their rollers, and screw conveyers or beaters above and parallel with the rollers and means for adjusting the screw conveyers or beaters toward or away from the rollers.

6. In an apparatus of the character described, the combination of a series of pairs of rollers, of doctor-knives for the rollers, means between the pairs of rollers for pressing the doctor-knives against the rollers and regulating the pressure, screw conveyers or beaters above the rollers and parallel therewith, movable boxing carrying the bearings for the several pairs of screw conveyers or beaters, and screws for adjusting said bearings to exactly position the screw conveyers or beaters with relation to the rollers.

7. In an apparatus of the character described, the combination with rollers, and doctor-knives against the rollers, of slotted brackets, and curved plates adjustably secured to the slotted brackets and engaging the cutter-knives to hold the seed and trash out of the compartment for cotton.

8. In an apparatus of the character described, the combination with a roller, a doctor-knife against the roller and a curved plate against the knife, of a plate at the opposite side of the roller engaging the same and forming, with the curved plate, a compartment to hold the seed and trash out of the cotton compartment or flue.

9. In an apparatus of the character described, the combination of a series of pairs of ginning-roller mechanisms, and a suction-flue below all of said rollers, of partitions between the pairs of rollers, projecting down into the suction-flue and preventing the suction from interfering with the operation of the rollers.

10. In an apparatus of the character described, the combination of several rollers and means for feeding seed-cotton at one end of all the rollers, of a trough at the other end of the rollers to receive the seed and a conveyer in said trough to move the seed therethrough.

11. In an apparatus of the character described, the combination with a series of rollers, of a distributer-box across one end of all of the rollers, sprocket-wheels at the ends of the box, endless chains around the wheels, cross-bars connecting the chains at intervals, and pins on said cross-bars.

12. In an apparatus of the character described, the combination with a series of rollers, and a distributer-box across one end of all the rollers and having openings above the same, of a conveyer in the box to convey the cotton to the openings, screw conveyers or beaters above the rollers, and toothed wheels between the screw conveyers or beaters and the holes in the box.

13. In an apparatus of the character described, the combination with a series of rollers, a box across one end of all of the rollers, and a conveyer in the box to move the cotton to the several rollers, of toothed wheels above the rollers to force the cotton down onto the rollers, and ratchet and pawl mechanism for driving the toothed wheels.

14. In an apparatus of the character described, the combination with a series of rollers and toothed feed-wheels for the rollers, of ratchet-wheels connected to turn the feed-wheels, a reciprocating bar, pawls on the bar engaging the ratchet-wheels, a lever to reciprocate the bar, a crank-shaft and a pitman connecting the crank-shaft and lever.

In testimony whereof I have signed this specification in the presence of two subscribing witnesses.

WILLIAM L. CROWSON

Witnesses:
J. G. CARTER,
B. J. C. BLALOCK.